Patented June 12, 1934

1,962,368

UNITED STATES PATENT OFFICE 1,962,368

PRODUCTION OF AURAMINE COLORING MATTERS

Guy W. Talbert, Summit, N. J., assignor to National Aniline & Chemical Company, Inc., New York, N. Y., a corporation of New York No Drawing. Application March 21, 1930, Serial No. 437,943

9 Claims. (Cl. 260—23)

This invention relates to the production of ketonimine coloring matters of the auramine group, and is particularly directed to improvements in the method of recovering these coloring matters from the crude melts or reaction masses obtained in their manufacture.

In the well-known processes of manufacturing an auramine coloring matter by fusing or heating with sulfur in the presence of ammonia and in the presence or absence of sodium chloride and/or ammonium chloride, a compound having the following probable general formula:

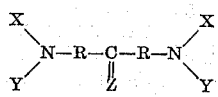

where R denotes an aryl group, particularly of the benzene series, e. g., $C_6H_4$, $CH_3.C_6H_3$, etc X denotes an alkyl group, e. g., $CH_3$, $C_2H_5$, etc., Y denotes a hydrogen atom or an alkyl group, e. g., $CH_3$, $C_2H_5$, etc., and Z stands for $H_2$, $CH(OH)$ or $CH(SH)$, it has heretofore been the practice to cool the hot melt or reaction mass which is obtained at the completion of the fusion or heating operation, and then wash or extract the cold melt with cold water to remove most, if not all, of the readily soluble salts or impurities which may be present. The washed, residual product containing the coloring matter is then dissolved in warm or hot water and the dyestuff precipitated from the filtered solution in any suitable manner, for example, by the addition of common salt thereto.

An object of the invention is to provide a process for the production of an auramine coloring matter whereby the same may be readily prepared in an economical manner.

Another object of the invention is to provide a process for the production of an auramine coloring matter whereby the time cycle of the process is shortened.

A further object of the invention is to provide a process for the production of an auramine coloring matter whereby time and labor are economized without reduction in yield or quality of the product.

Other objects of the invention will in part be obvious and will in part appear hereinafter.

According to the present invention, the hot crude melt or reaction mass containing the auramine coloring matter which is obtained at the completion of the fusion or heating operation, for example, as described above, is added, with little or no previous cooling, to cold or cooled water, preferably with stirring. The temperature of the water during the addition of the hot melt thereto is preferably not permitted to rise above about 50° C., and is preferably kept at a temperature of about 0° to 30° C. Water containing ice or no ice can be used. After the aqueous mixture has been stirred for a short time, the resulting residue is filtered off and dissolved in warm water containing an ammonium salt selected from the group consisting of ammonium sulfate, ammonium acetate and ammonium nitrate. The solution may be subsequently treated and the dyestuff recovered in any suitable or well known manner. It has been found that the addition of the hot crude melt or reaction mass to water has an advantage over previously described procedures in that it effects a considerable saving in time and labor in carrying out the process to completion. It also permits an increased production of the dyestuff since the reactor or fusion kettle becomes almost immediately available for use in subsequent fusions. Further, the yields and quality of dyestuff thus obtained are fully equal, if not superior, to those obtained by first cooling the melt and then treating it with water.

As an illustrative embodiment of a manner in which the invention may be carried into practice, the following example is presented: the parts are by weight.

Example.—An intimate mixture of 38 parts tetramethyldiaminodiphenylmethane, 10.6 parts sulfur, 21 parts ammonium chloride and 310 parts sodium chloride is heated, with stirring, to about 160° C. in a closed vessel having an inlet and outlet pipe, and a dry stream of gaseous ammonia under pressure slightly above atmospheric pressure (about ¼ to ½ an atmosphere gauge pressure) is passed or introduced into the vessel in contact with the mixture for about 8 to 9 hours, or until hydrogen sulfide is no longer evolved. When the reaction is completed, the hot melt or reaction mass, which is a brownish yellow powder, is added to 900 to 1000 parts of well-stirred water pre-cooled to about 5° to 20° C. The temperature of the dilution mixture rises to about 15° to 30° C. When all of the melt is added to the water, and the mixture has been stirred for a short time (about 10 to 30 minutes), the undissolved portion is filtered off and washed with a small amount of cold water. The washed residue is then dissolved in about 1500 parts of water at 70° to 75° C. containing about 10 parts of ammonium sulfate, the solution is filtered, and the auramine dyestuff is precipitated by the addition of common salt, and filtered off, washed and dried.

In the above example, the proportions and concentrations of the intermediates and reagents used, the temperatures employed, and other conditions, can vary over wide limits without departing from the spirit and scope of the invention. For example, the temperatures at which the fusion is carried out may vary from 140° to 220° C., but the preferred temperature is between about 155° and 180° C., a temperature of about 160° being commonly employed. The temperature of the hot reaction mass at the completion of the reaction will depend upon the temperature employed in the fusion step but the temperature of the reaction mass at the time it is added to water may vary from 100° to 220° C. Further, the temperature of the water in which the washed melt is dissolved is preferably not higher than about 85° C., temperatures of about 70° to 75° C. being preferred. As set forth above, in effecting the solution of the washed melt in hot water, in place of ammonium sulfate other ammonium salts may be used, such as ammonium acetate, ammonium nitrate, etc. The presence of the ammonium salt apparently retards or prevents the decomposition of the dyestuff to form the corresponding ketone.

In a similar manner, the present invention is applicable to the treatment of other hot melts or reaction masses obtained from the same or other diphenylmethane derivatives, their corresponding hydrols, and thiohydrols having the general formula described above. For example, the hot reaction masses obtained by fusing or heating a di- or tetramethyl-, or a di- or tetraethyl diaminodiphenyl- (or ditolyl)-methane, or their corresponding hydrols and thiohydrols, or other di- or tetraalkyldiamino-diarylmethanes or their hydrols or thiohydrols, with sulfur in the presence of gaseous ammonia, can be directly added with advantage, and without previous cooling, to cooled or cold water.

Since certain changes in carrying out the above process, which embodies the invention, may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In the process for the production of an auramine coloring matter wherein a hot reaction mass is obtained by heating with sulfur in the presence of ammonia a compound having the general formula:

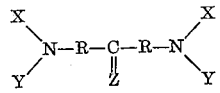

where R denotes an aryl group, X denotes an alkyl group, Y denotes a hydrogen atom or an alkyl group, and Z stands for $H_2$, CH(OH) or CH(SH), the improvement which comprises adding the hot reaction mass to water the temperature of which does not exceed 50° C. throughout the addition.

2. In the process for the production of an auramine coloring matter wherein a hot reaction mass containing the auramine coloring matter is obtained by heating with sulfur, ammonium chloride and sodium chloride in the presence of ammonia a compound having the general formula:

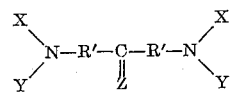

where R' denotes an aryl group of the benzene series, X denotes an alkyl group, Y denotes a hydrogen atom or an alkyl group, and Z stands for $H_2$, CH(OH), or CH(SH), the improvement which comprises adding the hot reaction mass at a temperature not lower than 100° C. to water maintained at a temperature below 50° C.

3. In the process for the production of an auramine coloring matter by heating a compound having the general formula:

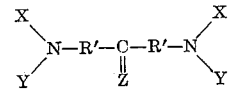

where R' denotes an aryl group of the benzene series, X denotes a $CH_3$ or a $C_2H_5$ group, Y denotes a hydrogen atom or a $CH_3$ or $C_2H_5$ group, and Z stands for $H_2$ CH(OH) or CH(SH), with sulfur in the presence of ammonia at a temperature of 140° to 220° C., the improvement which comprises adding the hot reaction mass at the completion of the heating operation to water at a temperature maintained at 0° to 30° C.

4. In the process for the production of an auramine coloring matter by heating tetramethyldiaminodiphenylmethane with sulfur in the presence of ammonia whereby a hot reaction mass containing the auramine coloring matter is obtained, the improvement which comprises adding the reaction mass while hot to cold water, the temperature of the water during the addition not exceeding 30° C.

5. In the process for the production of an auramine coloring matter by heating at an elevated temperature a compound having the general formula:

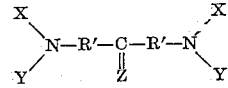

where R' denotes an aryl residue of the benzene series, X denotes an alkyl group, Y denotes a hydrogen atom or an alkyl group, and Z stands for $H_2$, CH(OH) or CH(SH), with sulfur in the presence of ammonia, the improvement which comprises adding the hot reaction mass obtained at the completion of the heating operation to cold water, filtering off the undissolved portion and dissolving it in hot water containing an ammonium salt.

6. In the process for the production of an auramine coloring matter by heating at an elevated temperature a compound having the general formula:

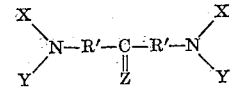

where R' denotes an aryl residue of the benzene series, X denotes an alkyl group, Y denotes a hydrogen atom or an alkyl group, and Z stands for $H_2$, CH(OH) or CH(SH), with sulfur in the presence of ammonia, the improvement which comprises adding the hot reaction mass obtained at the completion of the heating operation to cold water, filtering off the undissolved portion and dissolving it in hot water containing an ammonium salt selected from the group consisting of ammonium sulfate, ammonium acetate and ammonium nitrate.

7. In the process for the production of an auramine coloring matter by heating an intimate mixture of tetramethyldiaminodiphenylmethane, sulfur, sodium chloride and ammonium chloride in the presence of ammonia at a temperature of about 160° C. until hydrogen sulfide has substantially ceased being evolved, the improvement which comprises adding the hot fusion mass to cold water, filtering the solution, and dissolving the undissolved portion in water containing ammonium sulfate at a temperature of about 70° to 75° C.

8. The process for the production of an auramine coloring matter which comprises adding the hot melt resulting from the interaction of 38 parts of tetramethyldiaminodiphenylmethane, 10.6 parts of sulfur, 21 parts of ammonium chloride, 310 parts of sodium chloride, and an excess of ammonia gas at a temperature of 140° to 220° C. to 900 to 1000 parts of water pre-cooled to a temperature of about 5° to 20° C., without previous cooling of the melt.

9. The process for the production of an auramine coloring matter which comprises adding the hot melt resulting from the interaction of 38 parts of tetramethyldiaminodiphenylmethane, 10.6 parts of sulfur, 21 parts of ammonium chloride, 310 parts of sodium chloride, and an excess of ammonia gas to 900 to 1000 parts of water pre-cooled to a temperature of about 5° to 20° C., without previous cooling of the melt, stirring the mixture for a period of 10 to 30 minutes, filtering off and washing the undissolved portion of the melt, dissolving the washed residue in about 1500 parts of water containing about 10 parts of ammonium sulfate and having a temperature of 70° to 75° C., filtering, and precipitating the auramine coloring matter with common salt.

GUY W. TALBERT.